United States Patent [19]

Compter et al.

[11] Patent Number: 4,795,953
[45] Date of Patent: Jan. 3, 1989

[54] METHOD OF AND ELECTRONIC CIRCUIT FOR STARTING A RELUCTANCE MOTOR AND RELUCTANCE MOTOR PROVIDED WITH SUCH AN ELECTRONIC CIRCUIT

[75] Inventors: Johan C. Compter, Hoogeveen; Peter M. S. M. Heijmans, Eindhoven, both of Netherlands

[73] Assignee: U.S. Philips Corporation, New York, N.Y.

[21] Appl. No.: 69,451

[22] Filed: Jul. 2, 1987

[30] Foreign Application Priority Data

Jul. 10, 1986 [NL] Netherlands .......................... 8601801

[51] Int. Cl.$^4$ ............................................. H02P 8/00
[52] U.S. Cl. .................................... 318/696; 318/685; 318/701; 318/778
[58] Field of Search ................. 318/696, 685, 701, 778

[56] References Cited

U.S. PATENT DOCUMENTS

| | | | |
|---|---|---|---|
| 4,467,233 | 8/1987 | Morén et al. | 310/162 |
| 4,489,262 | 12/1984 | Morén | 318/700 |
| 4,506,182 | 3/1985 | Rohdin | 310/193 |

Primary Examiner—William M. Shoop, Jr.
Assistant Examiner—Saul M. Bergmann
Attorney, Agent, or Firm—Thomas A. Briody; Jack E. Haken; Anne E. Barschell

[57] ABSTRACT

A reluctance motor comprises a stator (S) provided with coils (W1, W2), and a rotor (R). The rotor R has pairs of positions of stable equilibrium and pairs of positions of unstable equilibrium. The reluctance motor is started by first bringing the rotor into a first position of stable equilibrium ($\theta = -\theta ms$) by means of a first energizing current and subsequently rotating it towards a second ($\theta = 0$) of stable equilibrium by means of a second energizing current.

14 Claims, 3 Drawing Sheets

METHOD OF AND ELECTRONIC CIRCUIT FOR STARTING A RELUCTANCE MOTOR AND RELUCTANCE MOTOR PROVIDED WITH SUCH AN ELECTRONIC CIRCUIT

BACKGROUND OF THE INVENTION

1. Field of the Invention

The invention relates to a method of starting a reluctance motor, having a rotor and a stator, by means of a suitable energising current, the rotor and/or the stator being constructed in such a way that the rotor has pairs of positions of stable equilibrium, each consituted by a first and a second position of stable equilibrium and corresponding pairs of positions of unstable equilibrium, each constituted by a first and a second position of unstable equilibrium.

The invention also relates to an electronic circuit and a reluctance motor.

2. Prior Art

U.S. Pat. No. 4,506,182 (herewith incorporated by reference) describes a method of starting a single-phase reluctance motor by applying current pulses to the stator windings. The amplitude and duration of the pulses are selected in such a way that periodically a part of the stator is magnetically saturated and the rotor oscillates about a position of equilibrium with increasing amplitude until it is set into rotation. A disadvantage of this known method is that starting of the motor proceeds comparatively slowly, inter alia because current pulses with a repetition rate of 1 Hz are utilized.

Further, U.S. Pat. No. 4,489,262 (herewith incorporated by reference) discloses a method of starting a reluctance motor in which during starting of the motor a plurality of successive current pulses with a repetition rate of 1 Hz is applied to the stator windings, at least a part of the rotor being magnetically saturated. By means of the applied energy the rotor is caused to oscillate until it assumes a position in which it is possible to exert a positive torque on the rotor, so that it is started in the desired direction.

SUMMARY OF THE INVENTION

It is the object of the invention to improve the known methods and to this end the invention provides a method of the type defined in the opening paragraph, which is characterized in that the rotor of the reluctant motor is first brought to or near one of the two positions of stable equilibrium of one of the pairs of positions of stable equilibrium by means of a first energising current of a certain value and subsequently such a torque is applied to the rotor by means of a second energising current of another value that the rotor rotates towards the other of said two positions of stable equilibrium. This enables the rotor to be brought into a desired initial position by means of a single impulse-like signal and subsequently to be started in the desired direction of rotation. Therefore, the starting process of the motor can be very short. The inventive method renders the reluctance motor better suited for use in appliances which have to be started frequently and which require a short starting time, such as vacuumcleaners and fans.

Preferably, in accordance with the invention, one position of stable equilibrium is a position of equilibrium in which no magnetic saturation occurs in the rotor and/or the stator and the other position of stable equilibrium is a position of equilibrium in which at least a part of the rotor and/or the stator is magnetically saturated. In this way it can be achieved that the motor always starts from the same position and rotates in the same direction. When the motor is started in this direction a larger friction torque can be overcome than when the motor is started in the opposite direction. However, starting in the other direction also falls within the scope of the invention.

The method in accordance with the invention may be further characterized in that during starting the first energising current is controlled in such a way that it is increased to a second value for which saturation occurs in at least a part of the rotor and/or the stator via a first value for which no saturation occurs in the rotor and/or the stator and is subsequently reduced to a third value for which no saturation occurs in the rotor and/or the stator. Suitably, increasing the energising current to the second value via the first value and subsequently reducing it to the third value in accordance with the invention is effected gradually in time.

In accordance with the invention the rotor can be brought into the desired initial position in a very controlled manner if the first value, and/or the second value and/or the third value of the first energising current are maintained for some time to allow the rotor to stabilise in the position of equilibrium it has assumed.

The invention also provides an electronic circuit for supplying a suitable first energising current during starting in accordance with the inventive method, which circuit is characterized in that it comprises means for determining time intervals, which means supply signals to an up/down counter, which signals reset the up/down counter at the beginning of a first time interval, cause the counter to count up for the first time interval, hold the counter at a first count for a second time interval and at a second count for a fourth time interval, cause the counter to count down for a third time interval, and set the counter to a preset count upon termination of the fourth time interval, which counter supplies a binary output signal, means for generating a periodically incremented binary signal, means for comparing the value of the binary output signal of the counter with the value of the periodically incremented signal, and means for energising a coil of the motor when the value of the binary output signal of the counter is larger than the value of the periodically incremented signal and de-energising said coil when the value of the binary output signal of the counter is smaller than the value of the periodically incremented signal.

The invention further provides a reluctance motor provided with an electronic circuit for supplying a suitable first energising current during starting in accordance with the inventive method.

BRIEF DESCRIPTION OF THE DRAWING

Methods in accordance with the invention will now be described in more detail, by way of example, with reference to the drawings, in which.

DETAILED DESCRIPTION OF THE PREFERRED EMBODIMENT

Figure 1:
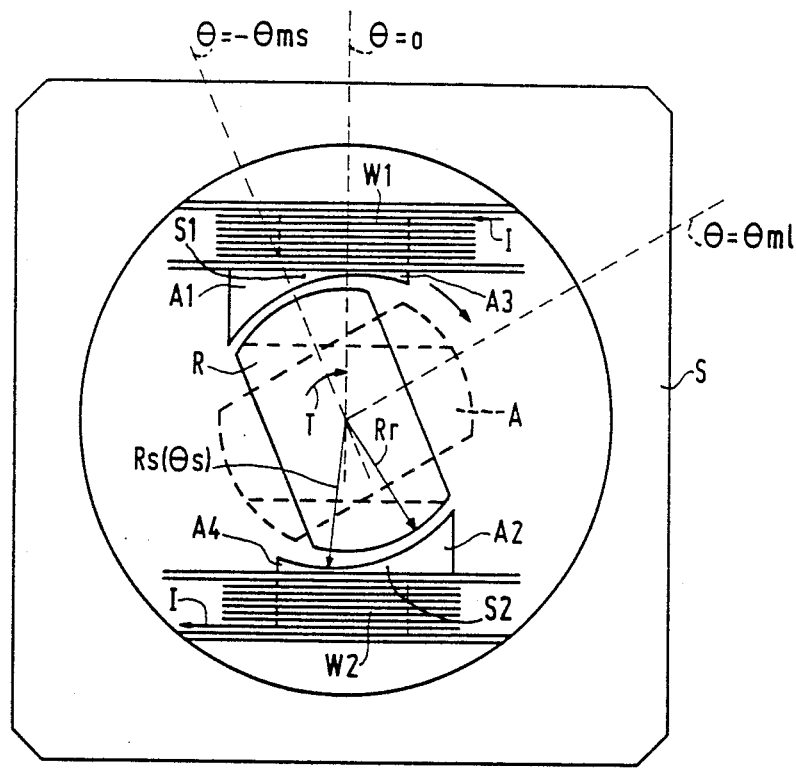
FIG. 1 shows diagrammatically a reluctance motor.

The methods in accordance with the invention will be described for a single-phase reluctance motor comprising two stator-teeth, as shown in FIG. 1. However, the invention is equally applicable, for example, to two-phase reluctance motors and reluctance motors comprising a multi-pole rotor and/or stator. The invention can also be used with a reluctance motor comprising a rotor of a cross-section in accordance with U.S. Pat. No. 4,489,262 or a reluctance motor having a stator teeth cross-section in accordance with U.S. Pat. No. 4,506,182.

The rotor R of the motor shown in FIG. 1 comprises a lamination assembly mounted on a shaft. The stator S is also laminated. Series-connected energising coils W1 and W2 are arranged around the stator teeth. The direction of the currents in these coils are indicated schematically. A current I is applied to the coils W1 and W2. The current I through the coils W1 and W2 can be controlled by means of a single switch (not shown). When the coils are energised with a sufficiently large current in the rotor position indicated in solid lines a torque T is developed in the indicated direction, causing the rotor to rotate about an axis of rotation A. When the rotor passes through the vertical position (line 0) the torque will become negative and act in the other direction. Therefore, the said switch is suitably opened before the vertical position is reached. The switch is closed again when the rotor approaches the horizontal position etc. In practical emobdiments the switch will be an electronic switch controlled by an electronic circuit or a suitably programmed microprocessor.

The stator teeth comprise projections A1 and A2 to define, as will become apparent hereinafter, a position of stable equilibrium for the rotor from which the motor can be started. The rotor radius Rr has a constant value, whilst the radius of the stator Rs ($\theta$s) is variable, as can be seen in FIG. 1. The value of the stator radius is a minimum near the projections A1 and A2 of the stator teeth S1 and S2 and a maximum at the sides A3 and A4 of the stator teeth. As a result of the projections A1 and A2 and the varying stator radius a well-defined position of stable equilibrium of the rotor is reached when the projections A1 and A2 are not magnetically saturated. This is the position shown in the drawings, the angular position $\theta$ of the rotor then being $-\theta$ms.

A major problem with the present type of motor is starting from an arbitrary position, such as the two positions of unstable equilibrium of the motor as indicated in broken lines. In accordance with the invention this problem is solved by the method described hereinafter.

Figure 2:
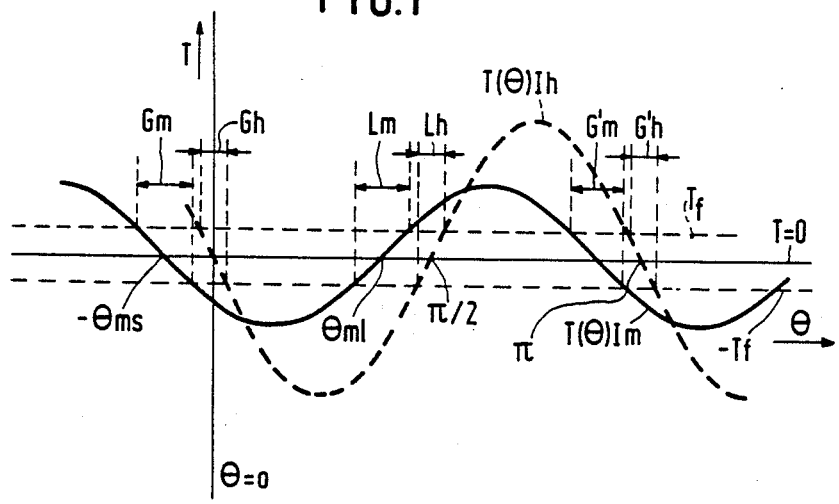
FIG. 2 shows the torque as a function of the angular rotation of the rotor of the reluctance motor, which torque is exerted on the rotor for two different energising currents.

Assuming that a current $I=Im$ flows through the coils W1 and W2 of the motor shown in FIG. 1, Im having such a value that the areas A1 and A2 are not yet saturated. For this value of the current I the preferred position of the rotor is now given by the angle $\theta = -ms + k\cdot\pi$, where k=0, 1, 2, ... This is the position of stable equilibrium of the rotor for the value Im (the position shown). When the rotor is brought out of this position of stable equilibrium by a small angular rotation (for example $<\pi/8$ rad) and is subsequently released the rotor will return to the area around this position of stable equilibrium if $I=Im$. The position of unstable equilibrium is given by the angle $\theta = \theta m1 + k\cdot\pi$, where k=0, 1, 2, ... When, for the value Im of the energising current, the rotor is brought past the unstable position related to this current and thus outside this angle $\theta m1 + K\pi$, the rotor will rotate towards the position of stable equilibrium. If the energising current I is now increased to a value Ih, for which the areas A1 and A2 are saturated, the position of stable equilibrium of the rotor is given by the angle $\theta = 0 + k\pi$, where k=0, 1, 2, ... The corresponding position of unstable equilibrium is given by the angle $\theta = \pi/2 + k\pi$, where k=0, 1, 2, ... The torques for the two values of the current Im and Ih as a function of the angular rotation $\theta$ of the rotor vary as shown in FIG. 2, the torques being indicated by T($\theta$)Im and T($\theta$)Ih respectively.

It is assumed that at rest the load of the motor exerts a maximum torque on the motor given by Tf and −Tf.

At rest, the rotor position is situated outside the range indicated by Lm, the rotor will move towards the range Gm or G'm (the desired starting position) in the case of a current Im. However, if the rotor position is situated within the range Lm when at rest, the rotor remains stationary because within this range the current Im cannot produce a torque larger than Tf. To set the rotor in motion the current is subsequently increased to Ih, causing the rotor to move to a positon in or near the range Gh (or G'h). Subsequently, the current is reduced to Im, causing the rotor to assume a position within said range Gm (or G'm). This is the desired starting position. The motor can always be started from this position. From this position a current pulse (Is≧Ih) will always cause the rotor to rotate in the same direction, in the present example clockwise, so that the starting problem is solved.

Figure 3A:
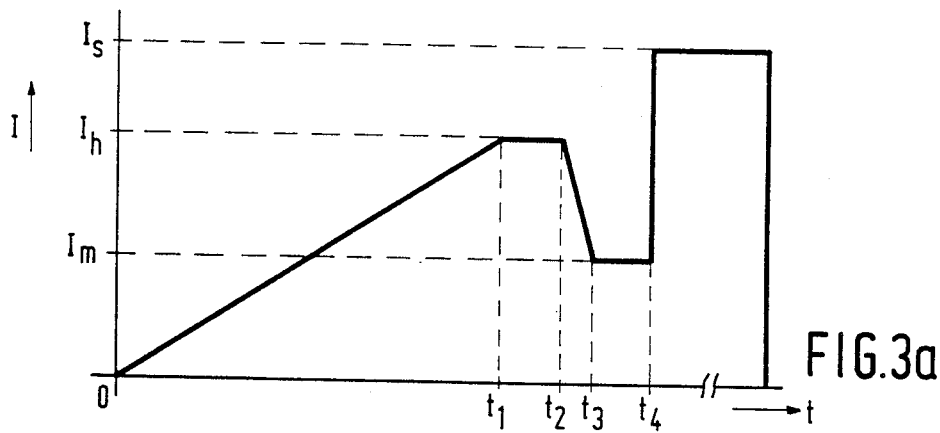
FIGS. 3a and 3b show the energising currents as a function of time during starting of the motor in accordance with a preferred embodiment of the inventive method.
Figure 3B:
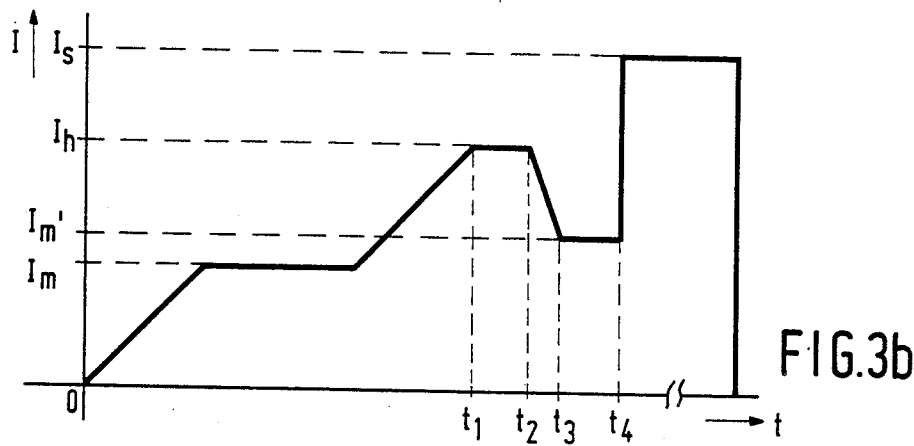

FIGS. 3a and 3b show how the current I may vary as a function of time during starting of the motor for two versions of the inventive method. The current I must be switched off when the rotor approaches the vertical position ($\theta \approx k\cdot\pi$), where k=0, 1, 2, ... as is indicated in FIGS. 3a and 3b.

FIG. 3a shows how the current preferably varies when the motor is switched on. In a first time interval between the instant t=0 and the instant t=t1 a first energising current increases to a value Ih via a first value Im, the portions A1 and A2 of the stator being magnetically saturated. This value Ih of the current is sustained in a second time interval t1-t2 and, subsequently, in a third time interval t2-t3 it is reduced to a value which may be equal to Im. During a time interval t3-t4 this value of the current is maintained again. At the end of this fourth time interval the rotor will assume the position shown in solid lines in FIG. 1 and the motor can always be started by applying an impulse-like second energising current to the stator winding, which current has a value Is larger than the value Ih. This current is preferable terminated before the rotor is in line with the stator teeth. Subsequently, the rotation of the motor can be sustained in a manner known per se.

FIG. 3b shows how the current I varies during starting as an alternative to the situation of FIG. 3a. Now the first energising current is maintained at a value Im for some time before it is increased to a value Ih and subsequently reduced to a value Im'. Since the current is maintained at the value Im for some time, the rotor is allowed to stabilise at the assumed position of equilibrium, so as to prevent overshooting. The values Im and Im' may differ but may also be equal. This applies to the values Im and Im' indicated in FIG. 4 to be described hereinafter.

Figure 4:
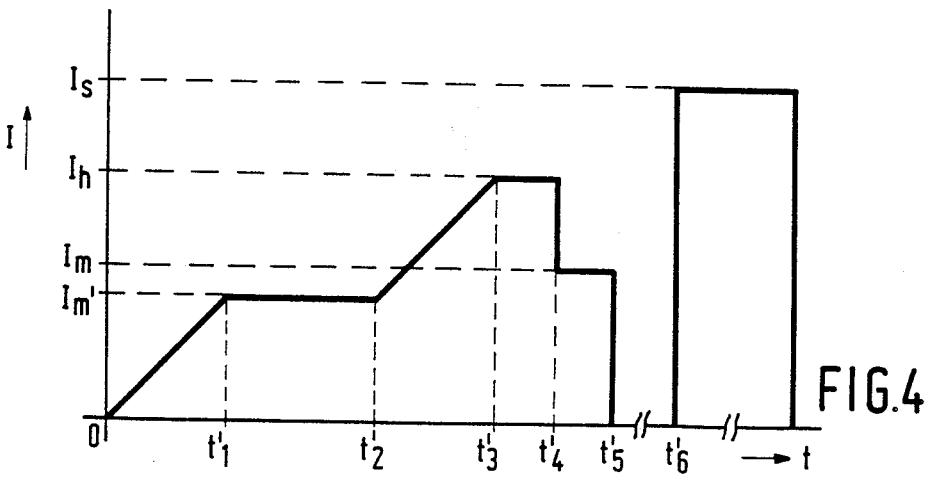
FIG. 4 shows the energising currents as a function of time during starting of the motor in accordance with another embodiment of the inventive method.

FIG. 4 shows an alternative method of starting the reluctance motor shown, for which the rotor will rotate counter-clockwise. When during starting the current I varies as shown in FIG. 4, the rotor will assume a specific position in the range Gh (or G'h) after the current has reached the value Ih (see FIG. 2). If subsequently the current is rapidly reduced to the value Im, and before $\theta = -ms$ the current I is switched off, the rotor can rotate counter-clockwise. It is then required that in the range between $\theta=0$ and $\theta=-\theta m$ enough energy can be applied to the rotor to rotate it through at least 90°, so that upon the occurrence of a subsequent current impulse (Is) the rotor can continue to rotate in the counter-clockwise direction, after which the motor is operated in the customary manner as described above. In principle, it is also possible to increase the current gradually from 0 to the value Ih, without maintaining it at the value Im' for some time.

The methods described can be carried out by means of an electronic circuit which can supply a first energising current in accordance with FIGS. 3a, b or 4, and which can also produce the other current impulses required in operation. For this purpose a programmed microprocessor may be employed which is capable of supplying the signals necessary for generating the energising currents in accordance with for example, FIGS. 3a and 3b.

Figure 5:
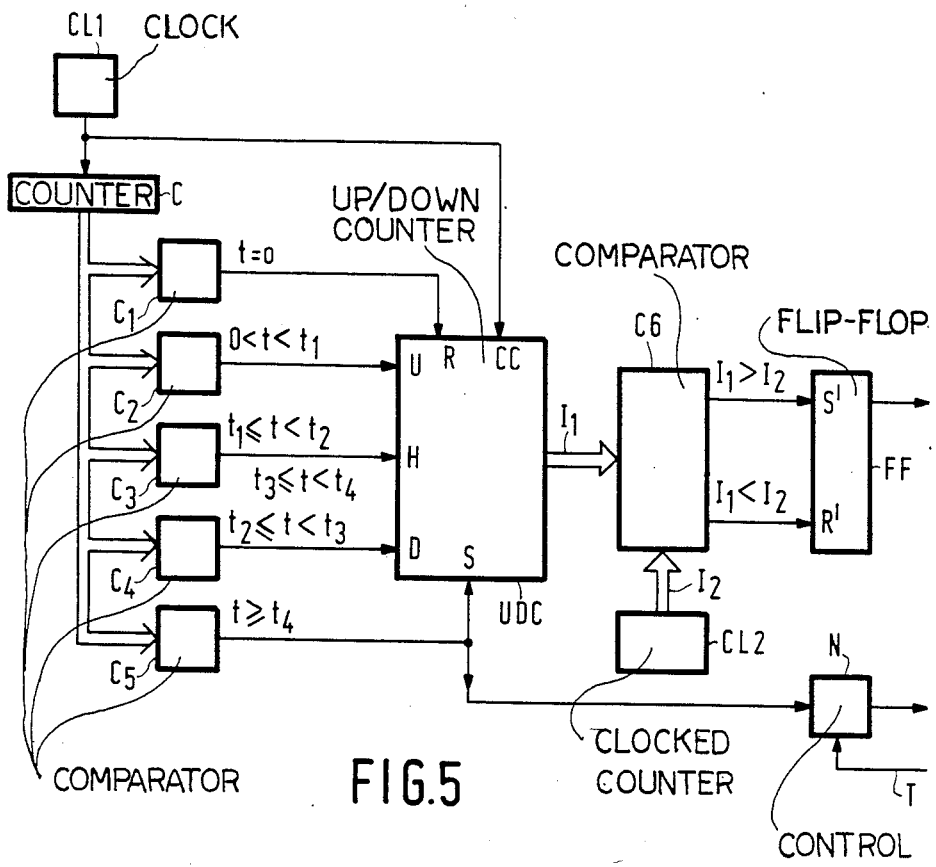
FIG. 5 shows the basic diagram of a circuit arrangement by means of which the inventive method can be carried out.

FIG. 5 shows an electronic circuit by means of which the methods described can, in principle, be carried out. In principle, the circuit shown in FIG. 5 is capable of supplying the first energising current shown in FIG. 3a. Therefore, FIG. 5 is described in relation to FIG. 3a. In FIG. 5 CL1 is a clock generating a clock signal which is applied to a counter C and to a count input CC of an up/down counter UDC. The output signal of the counter C, which may be for example a 8-bit signal, is applied to comparators C1, C2, C3, C4 and C5. The output signals of the comparators C1 to C5 are applied to the RESET input R, the count-up input U, the HOLD input H, the count-down input D and the SET input S respectively for setting the up/down counter UDC to a specific count. The output signal of the comparator C5 is also applied to a circuit N which in normal operation supplies the control signal for the energising current in the motor. The binary output signal I1 of the up/down counter UDC is applied to a comparator C6, to which also the binary output signal I2 of a clocked counter CL2 is applied. The binary signals I1 and I2 may be, for example, 8-bit signals. The clocking frequency of the clocked counter CL2 must be high relative to the frequency of the clock CL1. When the value of the binary signal I1 is larger than the value of the binary signal I2, the SET input a flip-flop FF is energised and the flip-flop supplies an output signal, causing the switch for energising the coils to be closed and energising current to be applied to the coils. When the binary value of the signal I1 is smaller than the value of the signal I2 the signal on the SET input S of the flip-flop FF becomes logic 0 and the RESET input R' of the flip-flop FF becomes logic 1, causing the switch to be opened, so that no current is applied to the energising coils of the motor. During normal operation the circuit N supplies the control signal for the switch of the motor under control of a suitable signal T, which is generated for example by photo-electric means to produce pulses having a specific amplitude at the appropriate instants.

At the instant $t=0$ the comparator C1 supplies a RESET signal to the input R of the counter UDC, so that in fact it functions as a starting circuit. In the interval 0–t1 (see FIG. 3a) the comparator C2 supplies a signal to the input U of the counter UDC, so that the counter counts up. In the intervals t1–t2 and t3–t4 the comparator C3 supplies a signal to the input H of the counter UDC to hold the counter at the count reached at the instants t1 and t3 respectively. In the interval t2–t3, the comparator C4 supplies a signal which causes the counter UDC to count down, which signal is applied to the input D. In the time interval after the instant t4 the comparator C5 supplies a signal to the SET input S of the counter UDC for setting the counter to a preset count. This signal is also applied to the circuit N. If the clock frequency of the clocked counter CL2 is sufficiently high relative to the frequency of the clock CL1, for example a factor of 10 higher, the current through the energising coils is switched in accordance with the pulse-width modulation principle. In the interval 0–t1 the current through the energising coils is continually switched on and off, the on-interval increasing relative to the off-interval until the instant t1. As a result of the presence of a freewheel circuit the current through the motor coils will oscillate about the linearly increasing value in accordance with FIG. 3a until the instant t1. In the interval t1–t2 the current through the coil will then oscillate about the constant value Ih, in the interval t2–t3 the current through the coils will then oscillate about the gradually decreasing value of the current, and in the interval t3–t4 the on-interval of the current through the motor coils will be constant relative to the intervals in which the current is switched off (this is also the case for the interval t1–t2), so that in the interval t3–t4 the current will oscillate about the value Im.

Variants of the circuit described are possible, for example, it is possible to apply the output signal of the up/down counter UDC to a digital-to-analog converter and to control the current through the energising coils by means of the analog signal thus obtained.

What is claimed is:

1. A method of starting a reluctance motor, having a rotor and a stator, by means of a suitable energising current, the rotor and/or the stator being constructed in such a way that the rotor has pairs of positions of stable equilibrium, each constituted by a first and a second position of stable equilibrium and corresponding pairs of position of unstable equilibrium, each constituted by a first and a second position of unstable equilibrium, comprising the steps of:
   (a) bringing the rotor to or near one of the two positions of stable equilibrium of one of the said pairs by means of a first energising current of a certain value; and
   (b) subsequently applying such a torque to the rotor by means of a second energising current of another value that the rotor rotates towards the other of said two positions of stable equilibrium.

2. The circuit of claim 1 wherein one position of stable equilibrium is a position of equilibrium in which no magnetic saturation occurs in the rotor and/or the stator and the other position of stable equilibrium is a position of equilibrium in which at least a part of the rotor and/or the stator is magnetically saturated.

3. An electronic circuit for supplying an energizing current to an energizing coil of a reluctance motor, the reluctance motor including a rotor and a stator, the rotor and stator being constructed so that the rotor has pairs of first and second positions of stable equilibrium and corresponding pairs of first and second positions of unstable equilibrium, comprising:
 (a) means for determining first, second, third, and fourth time intervals and having an output at which signals are supplied;
 (b) an up/down counter, responsive to the signals supplied by the means for determining, which counter is: reset at the beginning of the first time interval, counted up during the first time interval, held at a first count during the second time interval, counted down during the third time interval, held at a second count during the fourth time interval, and set to a preset count upon termination of the fourth time interval, the counter supplying a binary output signal;
 (c) means for generating a periodically incremented binary signal;
 (d) means for comparing the value of the binary output signal of the counter with the periodically incremented signal; and
 (e) means for switching on the energizing current through the energizing coil of the motor, when the binary output signal of the counter is larger than the value of the periodically incremented signal, and for switching off the energizing current, when the binary output signal of the counter is smaller than the periodically incremented signal, so that the rotor is first brought to or near one of the first and second positions of one of the pairs of positions stable equilibrium and subsequently the rotor rotates toward the other of the first and second positions of the one pair of positions stable equilibrium.

4. An electronic circuit for supplying an energizing current to an energizing coil of a reluctance motor, the reluctance motor including a rotor and a stator, the rotor and stator being constructed so that the rotor has first and second positions of stable equilibrium and first and second positions of unstable equilibrium, comprising:
 (a) means for determining first, second, third, and fourth time intervals and having an output at which signals are supplied;
 (b) an up/down counter, responsive to the signals supplied by the means for determining, which counter is: reset at the beginning of the first time interval, counted up during the first time interval, held at a first count during the second time interval, counted down during the third time interval, held at a second count during the fourth time interval, and set to a preset count upon termination of the fourth time interval, the counter supplying a binary output signal;
 (c) means for generating a periodically incremented binary signal;
 (d) means for comparing the value of the binary output signal of the counter with the periodically incremented signal; and
 (e) means for switching on the energizing current through the energizing coil of the motor, when the binary output signal of the counter is larger than the value of the periodically incremented signal, and for switching off the energizing current, when the binary output signal of the counter is smaller than the periodically incremented signal, so that the rotor is first brought to or near one of the first and second positions of stable equilibrium and subsequently the rotor rotates toward the other of the first and second positions of stable equilibrium.

5. A reluctance motor comprising:
 (a) a stator;
 (b) a rotor, the rotor and stator being constructed so that the rotor has pairs of first and second positions of stable equilibrium and corresponding pairs of first and second positions of unstable equilibrium;
 (c) an energizing coil;
 (d) An electronic circuit for supplying an energizing current to the energizing coil, comprising:
  (i) means for determinng first, second third, and fourth time intervals and having an output at which signals are supplied;
  (ii) an up/down counter, responsive to the signals supplied by the means for determining, which counter is: reset at the beginning of the first time interval, counted up during the first time interval, held at a first count during the second time interval, counted down during the third time interval, held at a second count during the fourth time interval, and set to a preset count upon termination of the fourth time interval, the counter supplying a binary output signal;
  (iii) means for generating a periodically incremented binary signal;
  (iv) means for comparing the value of the binary output signal of the counter with the periodically incremented signal; and
  (v) means for switching on the energizing current through the energizing coil of the motor, when the binary output signal of the counter is larger than the value of the periodically incremented signal, and for switching off the energizing current, when the binary output signal of the counter is smaller than the periodically incremented signal, so that the rotor is first brought to or near one of the first and second positions of one of the pairs of position of stable equilibrium and subsequently the rotor rotates toward the other of the first and second positions of the one of the pairs of stable equilibrium.

6. The method of claim 1 wherein:
 (a) the bringing step comprises bringing the rotor to or near the one of the two positions of stable equilibrium, which position corresponds to one of:
  (i) no magnetic saturation in the rotor and/or the stator; and
  (ii) magnetic saturation in at least a part of the rotor and/or the stator; and
 (b) the applying step comprises applying the torque so that the rotor rotates towards the other one of the two positions of stable equilibrium, which position corresponds to the other one of:
  (i) no magnetic saturation in the rotor and/or the stator; and
  (ii) magnetic saturation in at least a part of the rotor and/or the stator.

7. The method of claim 6 wherein the bringing step comprises:
 (a) increasing the first energizing current via a first value to a second value, the first value being one for which no saturation occurs in the rotor and/or the stator, and the second value being one for which at least a part of the rotor and/or the stator is saturated; and (b) subsequently reducing the first energizing current to a third value for which no saturation occurs in the rotor or the stator.

8. The method of claim 1 wherein the bringing step comprises:
 (a) increasing the first energizing current via a first value to a second value, the first value being one for which no saturation occurs in the rotor and/or the stator, and the second value being one for which at least a part of the rotor and/or the stator is saturated; and
 (b) subsequently reducing the first energizing current to a third value for which no saturation occurs in the rotor or the stator.

9. The method of claim 8 wherein:
 (a) the increasing step comprises gradually increasing the first energizing current; and
 (b) the reducing step comprises gradually reducing the first energizing current.

10. The method of claim 8 comprising the step of maintaining the first value of the first energizing current for an interval of time.

11. The method of claim 8 comprising the step of maintaining the second value of the first energising current for an interval of time.

12. The method of claim 8 comprising the step of maintaining the third value of the first energising current for an interval of time.

13. The method of claim 8 comprising at least one of the following steps:
 (a) first maintaining the first value of the first energising current for a first interval of time;
 (b) second maintaining the second value of the first energising current for a second interval of time; and
 (c) third maintaining the third value of the first energising current for a third interval of time.

14. A method for bringing a reluctance motor having a rotor and a stator to a suitable starting position by means of an energising current, the rotor and/or the stator being constructed in such a way that the rotor has a plurality of pairs of positions of stable equilibrium, and a corresponding plurality of pairs of positions of unstable equilibrium, the method comprising the steps of:
 (a) starting from an unknown rotor position;
 (b) raising the energising current via a first value to a second value, the first value corresponding to a first pair of positions of stable equilibrium and a first pair of positions of unstable equilibrium, and the second value corresponding to a second pair of positions of stable equilibrium and a second pair of positions of unstable equilibrium, whereby the position of the rotor is at least slightly perturbed from the unknown position; and
 (c) lowering the energising current to the first value, whereby the rotor assumes one of the first pair of positions of stable equilibrium rather than one of the first pair of positions of unstable equilibrium.

* * * * *